Oct. 10, 1961  R. M. SIEVERT  3,004,164
METHOD AND APPARATUS FOR MEASURING IONIZATION RADIATION
Filed Nov. 19, 1957
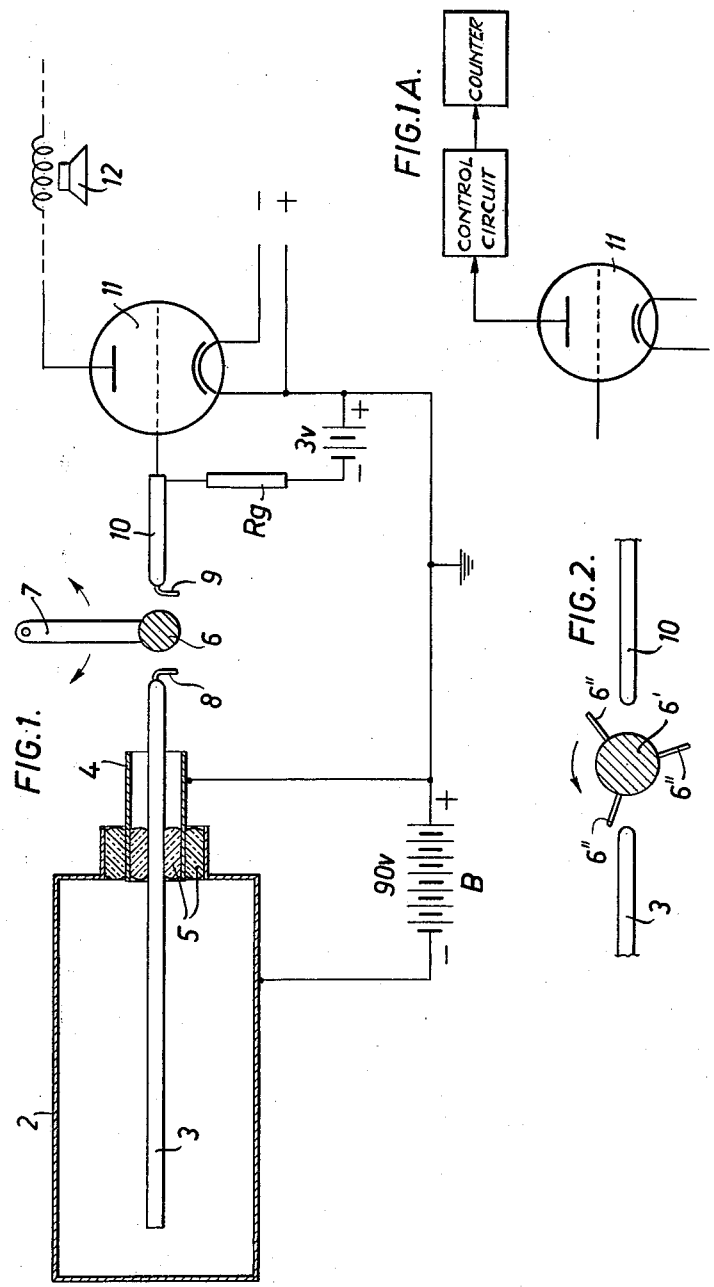
Inventor
Rolf Maximilian Sievert
by Walter H. Young
Attorney United States Patent Office 3,004,164
Patented Oct. 10, 1961

3,004,164
METHOD AND APPARATUS FOR MEASURING IONIZATION RADIATION
Rolf Maximilian Sievert, % Radiofysiska Inst., Stockholm 60, Sweden
Filed Nov. 19, 1957, Ser. No. 697,487
Claims priority, application Sweden Nov. 22, 1956
10 Claims. (Cl. 250—83.6)

The invention refers to a method and an arrangement or apparatus for measuring any ionization radiation, especially the radioactive radiation, by means of an ionization chamber provided with an insulated electrode, and an output circuit including or connectable to a detecting device.

The object of the invention is to facilitate the detection of detrimental quantities of any ionization radiation and to create a corresponding arrangement which is of a particular simple construction and can be manufactured at a low price but nevertheless being capable of reliably detectig whether an ionization radiation of a dangerous quantity has occurred during a certain period of time, or not. A specific object of the invention is to render the arrangement suitable for utilization in combination with a detector device comprising the loudspeaker of a conventional radio receiver, and a related object is to render the arrangement suitable for utilization in combination with a detecting device comprising a counter.

The principle underlying the method according to the invention for measuring the ionizing radiation consists in that the charge which on account of any incident radiation has collected or accumulated on the insulated electrode of the ionization chamber during a certain period of time, is at the end of said period of time transferred step by step—as portions of the charge, that is partial charges—into the output circuit, and that voltage pulses corresponding to these partial charges are counted by the aid of the detecting device.

The arrangement or apparatus according to the invention is chiefly characterized by a capacity or condensor means which is designed with an electrostatic capacity which is only a fraction of the electrostatic capacity of said ionization chamber electrode and which when a measuring operation is to take place is repeatedly connected to said ionization chamber electrode and to the output circuit, alternately and momentarily, said capacity or condensor means being normally isolated from said ionization chamber electrode and the output circuit. Through this capacity or condensor means which is caused to operate when a measuring operation is to take place, the charge which on account of incident ionization radiation has collected or accumulated on said ionization chamber electrode during a predetermined extended perior of time, for instance twenty-four hours, can be transferred step by step to the output circuit and the detecting device at the end of said predetermined period of time. Consequently, the number of partial charges and voltages pulses, which are received by the output circuit and the detecting device, corresponds with the quantity of the radiation incident during said period of time. Thus, the arrangement according to the arrangement may be referred to as a partial charge counter.

Said capacity means may comprise one or more electrically conductive bodies of proper electrostatic capacity, which bodies are adapted to perform an aperiodic or periodic movement such that they thereby are brought in an alternating connection with said ionization chamber electrode which is designed with a predetermined electrostatic capacity, and an element which is connected to the input side of said output circuit and which also is made with a predetermined electrostatic capacity, substantially the same as said conductive bodies. While such a conductive body is in contact with said ionization chamber electrode, a portion of the charge of said electrode is transferred to the conductive body, and while this conductive body is in contact with the above-mentioned element connected to the input side of the output circuit, this partial charge is transferred from said body to said element and a voltage pulse corresponding thereto is supplied to the output circuit. The same cycle is repeated until said ionization chamber electrode has been completely discharged. Then the movement of the conductive body is stopped.

Preferably the detecting device is over an amplifier controlled by the individual partial charges and the corresponding voltage pulses supplied thereto. The detecting device may comprise a registering device, such as a counter, and/or a signal device of optic or acoustic type. Also an electrometer or any other electrostatic measuring device could be used as detecting or indicating device, but in arrangements adapted for private use it is especially advantageous to provide an acoustic signal device in the form of a conventional radio receiver together with a loudspeaker, the remaining parts of the arrangements being combined within the radio receiver or being as a separate unit connectable to said receiver.

The invention will be more fully explained in the following specification by reference to the accompanying drawing, in which FIG. 1 illustrates diagrammatically one embodiment of the invention, while FIG. 1A and FIG. 2 illustrate modifications thereof.

In FIG. 1, the reference numeral 2 indicates a conventional gaseous ionization chamber in the form of a tube of an electrically conductive material. In one end of this tube the central electrode 3 and the protective cylinder 4 both made of electrically conductive material are sealed by means of any suitable insulation mass 5. The battery B is connected to the wall of the ionization chamber and to the protective cylinder, respectively, said cylinder being connected to ground.

In this embodiment, the capacity means according to the invention comprises a preferably ball-shaped body 6 of a metallic material having a high electric conductivity. Said metallic body is supported by and insulated from an oscillating or rocking arm 7, preferably made entirely of an insulating material, and is thereby movable to and fro within an air-gap confined by two contact members 8 and 9. One of said contact members 8 is connected to said ionization chamber electrode 3 and the other 9 is provided on a pin 10 or any similar conductive element which has a suitable predetermined electrostatic capacity and is connected to the input side of the output circuit. For instance, said pin 10 may be connected to the control grid of a vacuum amplifier tube 11 operating on a radio receiver loudspeaker 12. Thus, in this embodiment said loudspeaker constitutes a detecting or indicating device of acoustic type. However, it should be understood that also detecting devices of other types could be used, for instance a counter operated over a suitable control circuit of any well-known type, as indicated in FIG. 1A, such counter constituting a detecting device of optic type. The oscillating arm 7 could be operated by hand but is preferably connected with a timed driving device of any suitable type, capable of imparting to the metallic body 6 an oscillatory movement within the air-gap, for instance 1 to 3 oscillations per second. Said driving device could for instance be a clock-work or a similar timed mechanism together with means for coupling the same to said arm at any point of time as desired. As the driving means do not constitute any feature of the invention and may be of any well-known type, the same have not been shown in the drawing.

It should be understood that the values of the electrostatic capacity of the electrode 3, the metallic body 6 and the pin 10 should bear a certain mutual relationship for securing the function desired and a suitable size of the partial charges adapted to be transferred. Thus, the electrostatic capacity of the metallic body 6 should be only a fraction of the electrostatic capacity of the electrode 3. The electrostatic capacity of the pin 10 should be of the same order as that of the metallic body 6 or somewhat greater. For illustrative purposes might be mentioned that the electrode 3 could have a capacity of about 10 centimeters according to the electrostatic system of units (1 cm.=10/9 micromicrofarad), while the associated value for the metallic body 6 and for the metallic pin 10 could be approximately 1 to 3 centimeters. However, the capacity of the body 6 could be a still smaller fraction of that of the electrode 3, for instance ½₀ thereof. A suitable value of the grid resistance $R_g$ is $10^{10}$ ohms.

If said metallic body 6 is set in an oscillatory movement by means of said driving device, for instance at a predetermined point of time each day, the metallic body 6 will step by step transfer to the pin 10 the charge which has collected or accumulated on the electrode 3 during the past period of time of 24 hours. Each time when the metallic body 6 is in engagement with the contact member 8, one portion of the charge of the electrode 3 will pass over to the metallic body 6. Then, when the metallic body 6 subsequently engages the contact member 9, this partial charge passes over to the contact member 9 and the pin 10, whereby a corresponding voltage pulse is applied to the grid of the amplifier 11. The same cycles will be repeated until the total charge of the electrode 3 has been entirely transferred to the output circuit in the form of a corresponding number of partial charges and voltage pulses. For each such voltage pulse appearing on the grid of the amplifier a click in the loudspeaker is heard. Thus, by counting the number of clicks one will get the information whether the quantity of radiation incident during the said predetermined period of time has been normal or not.

In the modification illustrated in FIG. 2, the capacity means according to the invention comprises a preferably cylindrical metallic body 6' which is supported by and insulated from a drive shaft (not shown). Said body is rotatable in the air-gap confined by two contact members which in this modification are the end portions of the ionization chamber electrode 3 and the pin 10. The metallic body 6' has an odd number of contacts 6" which are uniformly distributed over the circumference. According to FIG. 2, three such contacts are provided and they are made as flat spring contacts. When the drive shaft of the metallic body 6' is set into operation, the individual contacts 6" are successively brought in connection with alternating ones of the two air-gap contact members. Thus, also in this case the charge of the electrode 3 is transferred step by step as partial charges to the pin 10 and further as corresponding voltage pulses to the amplifier.

It is not necessary to utilize a vacuum tube amplifier but also transistor amplifiers may be used, as should be understood by those skilled in the art. When indicating devices of very high sensitivity are used, such as certain well-known types of electrometers, for example, the amplifier may be avoided. It is also possible to automatically start the movable conductive body at predetermined points of times and to register the number of partial charges or voltage pulses in a detecting device provided with recording means.

Instead of a movable capacity means, such as the oscillating or rotating metallic body, a stationary condenser means of a proper electrostatical capacity could be used, which through a suitable well-known switch comprising an oscillating or rotatable contact member is connected alternately to the ionization chamber electrode and the output circuit, respectively.

It should be understood that the invention is not restricted to the embodiments illustrated in the drawing and described above, many modifications being possible without departing from the principal features of the invention as claimed.

I claim:
1. Apparatus for measuring ionization radiation, comprising an ionization chamber provided with an insulated electrode designed with a predetermined electrostatic capacity, an output circuit extending to a detecting device, a capacity means designed with an electrostatic capacity which is a fraction of the electrostatic capacity of said ionization chamber electrode, and moving means for positively connecting said capacity means at the end of a predetermined period of time repeatedly to said ionization chamber electrode and said output circuit in an alternating succession for transferring any charge collected on said ionization chamber electrode during said extended period of time as a result of incident ionization step by step into said output circuit for actuating said detecting device as many times as corresponds to the number of steps required for transferring said charge.

2. Apparatus for measuring ionization radiation, comprising, an ionization chamber provided with an insulated electrode designed with a predetermined electrostatic capacity, an output circuit extending to a detecting device, a capacity means normally isolated from said ionization chamber electrode and from said output circuit and designed with an electrostatic capacity which is a fraction of the electrostatic capacity of said ionization chamber electrode, moving means for positively connecting said capacity means at the end of a predetermined period of time repeatedly to said ionization chamber electrode and said output circuit in an alternating succession for transferring any charge collected on said ionization chamber electrode during said extended period of time as a result of incident ionization radiation step by step as partial charges into said output circuit, and means in said output circuit for producing from each such partial charge a corresponding voltage pulse for actuating said detecting device as many times as corresponds to the number of partial charges.

3. Apparatus for measuring ionization radiation, comprising, an ionization chamber provided with an insulated electrode designed with a predetermined electrostatic capacity, an output circuit extending to a detecting device, a capacity means normally isolated from said ionization chamber electrode and from said output circuit and designed with an electrostatic capacity which is a fraction of the electrostatic capacity of said ionization chamber electrode, moving means for positively connecting said capacity means at the end of a predetermined period of time repeatedly to said ionization chamber electrode and said output circuit in an alternating succession for transferring any charge collected on said ionization chamber electrode during said extended period of time as a result of incident ionization radiation step by step as partial charges into said output circuit, an element connected in the input side of said output circuit and designed with an electrostatic capacity which is at least of the same order as the electrostatic capacity of said capacity means for successively receiving each one of said partial charges and transferring the same as corresponding individual voltage pulses to said detecting device for actuating said detecting device as many times as corresponds to the number of partial charges.

4. Apparatus for measuring ionization radiation, comprising, an ionization chamber provided with an insulated electrode designed with a predetermined electrostatic capacity, an output circuit extending to a detecting device, a capacity means normally isolated from said ionization chamber electrode and from said output circuit and designed with an electrostatic capacity which is a fraction of the electrostatic capacity of said ionization chamber electrode, moving means for positively connecting said capacity means at the end of a predetermined period of time repeatedly to said ionization chamber electrode and said output circuit in an alternating succession for transferring any charge collected on said ionization chamber electrode during said extended period of time as a result of incident ionization radiation step by step as partial charges into said output circuit, an element connected in the input side of said output circuit and designed with an electrostatic capacity which is at least of the same order as the electrostatic capacity of said capacity means for successively receiving each one of said partial charges, and means for transferring corresponding voltage pulses into said detecting device for actuating the same as many times as corresponds to the number of partial charges.

5. Apparatus for measuring ionization radiation, comprising, an ionization chamber provided with an insulated electrode designed with a predetermined electrostatic capacity, an output circuit extending to a detecting device, a first contact member disposed outside of said ionization chamber and connected with said electrode, a second contact member connected to the input side of said output circuit, said two contact members forming together an air-gap, a conductive body disposed in said air-gap and normally isolated from said two contact members, said conductive body being designed with an electrostatic capacity which is a fraction of the electrostatic capacity of said ionization chamber electrode, a conductive element connected between said second contact member and the input side of said output circuit and designed with an electrostatic capacity which is substantially of the same order as the electrostatic capacity of said conductive body, moving means for positively connecting said conductive body at the end of a predetermined period of time repeatedly to said first contact member and said second contact member in an alternating succession for transferring any charge collected on said ionization chamber electrode during said extended period of time as a result of incident ionization radiation during said extended period step by step as partial charges to said conductive element disposed in the input side of said output circuit, said conductive element receiving only one such partial charge at the time, and means in said output circuit for transferring one voltage pulse in response to each partial charge into said detecting device for actuating the same as many times as corresponds to the number of partial charges.

6. Apparatus for measuring ionization radiation as claimed in claim 5, wherein said conductive body disposed in said air-gap is mounted on a rockable arm for oscillating movement between said two contact members.

7. Apparatus for measuring ionization radiation as claimed in claim 5, wherein said conductive body is mounted for rotation and supports an odd number of contacts provided for successive connection with said two contact members alternately.

8. Apparatus for measuring ionization radiation as claimed in claim 5, wherein said detecting device is controlled over an amplifier included in said output circuit for amplifying said voltage pulses.

9. Apparatus for measuring ionization radiation as claimed in claim 5, wherein said detecting device comprises a loudspeaker.

10. Apparatus for measuring ionization radiation as claimed in claim 5, where said detecting device comprises a counter actuated over a control circuit.

References Cited in the file of this patent
UNITED STATES PATENTS

| | | |
|---|---|---|
| 2,124,600 | Worrall | July 26, 1938 |
| 2,676,270 | Lahti | Apr. 20, 1954 |
| 2,728,861 | Glass | Dec. 27, 1955 |
| 2,842,674 | Barstad | July 8, 1958 |
| 2,912,626 | Von Gugeberg | Nov. 10, 1959 |

FOREIGN PATENTS

| | | |
|---|---|---|
| 74,155 | Austria | Feb. 11, 1918 |